(No Model.)

M. A. WILCOX.
BAKE PAN.

No. 496,078. Patented Apr. 25, 1893.

Witnesses

Inventor
Margaret A. Wilcox,
By T. J. W. Robertson,
Attorney

UNITED STATES PATENT OFFICE.

MARGARET A. WILCOX, OF CHICAGO, ILLINOIS.

BAKE-PAN.

SPECIFICATION forming part of Letters Patent No. 496,078, dated April 25, 1893.

Application filed July 7, 1892. Serial No. 439,243. (No model.)

*To all whom it may concern:*

Be it known that I, MARGARET A. WILCOX, a citizen of the United States, residing at Chicago, Cook county, Illinois, have invented certain new and useful Improvements in Bake-Pans, of which the following is a specification, reference being had therein to the accompanying drawings.

This improvement is designed to provide a bake pan that will be much more convenient than those at present employed for baking pies, &c., and the invention consists in the peculiar construction, arrangement and combinations of parts hereinafter more particularly described and then definitely claimed.

Figure 1:
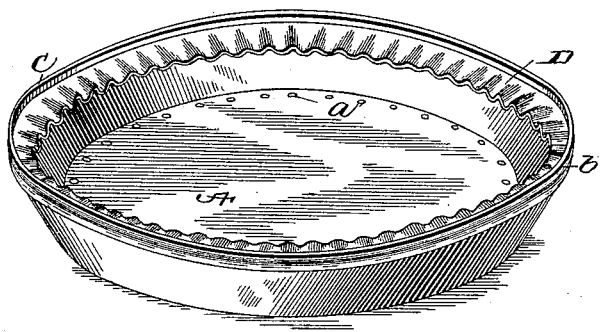
Figure 2:
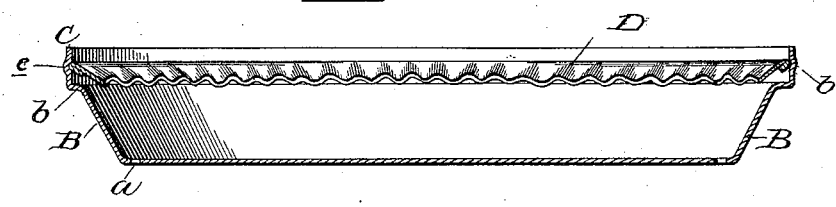
Figure 3:
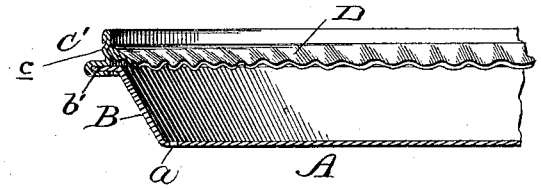

In the accompanying drawings—Figure 1 represents a perspective view of a bake pan constructed according to my improvement. Fig. 2 is a central vertical section of the same. Fig. 3 is a modification.

Similar letters indicate corresponding parts in all the figures.

Referring now to the details of the drawings—A represents the body of the pan, preferably provided with perforations $a$ around the edge of the bottom, and having the usual inclined and horizontal crust supporting rims B $b$, above which rises a vertical rim C, made in one piece with the body of the plate and corrugated circumferentially as shown plainly in Fig. 2. Inside this rim is set a cover rim D, tightly fitting in the vertical rim which will press together and hold the outer edge of the upper and lower crusts, absolutely preventing the escape of the juices. This cover may be corrugated radially as shown, or it may be stamped in any desired design, such as flowers, fruits or ornaments of any kind. When designed for baker's or hotel use, the rim may have stamped on it a design or word indicating the kind of pie, as "Apple," "Peach," "Strawberry," &c., or the maker's name or trade-mark.

I deem it important that the cover be set inside the vertical rim, because should any of the juice bubble out between the rim and cover, it will not rise over the vertical rim but run down on the top of the cover on the pie, and thus will be removed with the pie and not remain in the oven to burn and smoke.

What I claim as new is—

1. A pie plate provided with a vertical rim C having a groove therein and an annular cover D fitting in said groove, substantially as described.

2. A pie plate provided with a vertical rim C and an annular cover having its face corrugated radially and setting within and held in place by the vertical rim, substantially as described.

In testimony whereof I affix my signature, in presence of two witnesses, this 30th day of June, 1892.

MARGARET A. WILCOX.

Witnesses:
J. P. HAND,
OTTO E. FREUND.